United States Patent
Tarbotton et al.

(10) Patent No.: US 7,272,724 B2
(45) Date of Patent: Sep. 18, 2007

(54) USER ALERTS IN AN ANTI COMPUTER VIRUS SYSTEM

(75) Inventors: Lee Codel Lawson Tarbotton, Leicester (GB); Robert Edward Moore, Bierton (GB); Daniel Joseph Wolff, Aylesbury (GB)

(73) Assignee: McAfee, Inc., Santa Clara, CA (US)

( * ) Notice: Subject to any disclaimer, the term of this patent is extended or adjusted under 35 U.S.C. 154(b) by 681 days.

(21) Appl. No.: 09/785,216

(22) Filed: Feb. 20, 2001

(65) Prior Publication Data

US 2002/0116542 A1    Aug. 22, 2002

(51) Int. Cl.
*H04K 1/00* (2006.01)
*H04L 9/00* (2006.01)
*G06F 11/30* (2006.01)
*G06F 12/14* (2006.01)
*G06F 17/30* (2006.01)
*G06K 9/00* (2006.01)
*H03M 1/68* (2006.01)

(52) U.S. Cl. .......................... 713/188; 726/22; 726/23; 726/24; 726/25; 726/26; 726/27; 726/28; 726/29; 714/38; 714/45

(58) Field of Classification Search .................. 714/38, 714/45; 713/200, 188
See application file for complete search history.

(56) References Cited

U.S. PATENT DOCUMENTS

| 5,440,723 | A | * | 8/1995 | Arnold et al. | ................. 714/2 |
| 5,918,008 | A | * | 6/1999 | Togawa et al. | ............. 713/200 |
| 6,029,256 | A | * | 2/2000 | Kouznetsov | ................. 714/38 |
| 6,094,731 | A | * | 7/2000 | Waldin et al. | ................. 714/38 |
| 2001/0033657 | A1 | * | 10/2001 | Lipton et al. | ................. 380/201 |

* cited by examiner

*Primary Examiner*—Ayaz Sheikh
*Assistant Examiner*—Longbit Chai
(74) *Attorney, Agent, or Firm*—Zilka-Kotab, PC; Christopher J. Hamaty

(57) ABSTRACT

An anti computer virus program uses a library of virus drivers that includes an indication of whether a particular virus can cause irreparable damage and data indicating enhanced user warnings and actions that might be associated with such viruses. If a detected computer virus is one that can cause irreparable damage, then an enhanced user warning (16) is issued indicating this to the user and a notification (28) of the possibility of such corruption is added into the repaired computer file. The notification may take the form of an electronically signed (30) banner message or the like.

12 Claims, 4 Drawing Sheets

| Driver | Uncleanable Damage | Notification Type |
|---|---|---|
| . | . | . |
| . | . | . |
| . | . | . |
| WpCap | ✗ | Standard |
| . | . | . |
| . | . | . |
| . | . | . |
| WAZZU | ✓ | Enhanced Warning Word Banner |
| . | . | . |
| . | . | . |
| . | . | . |
| Love Letter | ✗ | Standard |
| . | . | . |
| . | . | . |
| . | . | . |

| Driver | Uncleanable Damage | Notification Type |
|---|---|---|
| . | . | . |
| . | . | . |
| . | . | . |
| . | . | . |
| WpCap | ✗ | Standard |
| . | . | . |
| . | . | . |
| . | . | . |
| . | . | . |
| WAZZU | ✓ | Enhanced Warning Word Banner |
| . | . | . |
| . | . | . |
| . | . | . |
| Love Letter | ✗ | Standard |
| . | . | . |
| . | . | . |
| . | . | . |
| . | . | . |

FIG. 1

USER ALERTS IN AN ANTI COMPUTER VIRUS SYSTEM

BACKGROUND OF THE INVENTION

1. Field of the Invention

This invention relates to the field of data processing systems. More particularly, this invention relates to anti computer virus systems that generate a user warning upon detection of a computer virus.

2. Description of the Prior Art

It is known to provide anti computer virus programs that apply tests for a large number of known virus types and characteristics. If a computer virus is detected, then a warning is issued to the user and the user is given the option to delete, quarantine or clean the infected file.

A computer file infected with a computer virus may contain valuable data and accordingly the ability to clean that file rather than delete it is often highly advantageous. The cleaning and repair of a computer file typically involves the removal of the computer virus code from that file and the reversal of any changes made by that computer virus to the file. However, there are known computer viruses that produce changes to a computer file that cannot be automatically repaired. An example of such a virus is Wazzu which will infect a Word document and insert the text Wazzu at random points within that document as well as swapping the position of some adjacent words within that document. Whilst it may be possible to remove the Wazzu insertions, detecting whether or not particular words within the document have had their positions altered is not something that can automatically be detected with certainty. There are also examples of computer viruses that infect Excel files and will modify data values within cells of that file in a manner that cannot be automatically detected. Depending upon how many times the computer virus has been activated within that file before it is removed, the degree of alteration that may have occurred can vary significantly.

SUMMARY OF THE INVENTION

Viewed from one aspect the present invention provides a computer program product comprising a computer program operable to control a computer to apply a plurality of anti computer virus tests to a target computer file, said computer program comprising:

(i) virus scanning logic operable to detect if said target computer file is infected with a computer virus;

(ii) virus cleaning and file repair logic operable to remove a detected computer virus from said target computer file and repair damage caused by said detected computer virus to said target computer file;

(iii) virus identifying logic operable to detect whether or not said detected computer virus is of a type that can cause damage to said target computer file that cannot be repaired by said virus cleaning and file repair logic; and (iv) warning generating logic operable if said detected computer virus is of a type that can cause damage to said target computer file that cannot be repaired by said virus cleaning and file repair logic to generate a warning to a user that said target computer file may have suffered irreparable damage.

The invention recognises that whilst the provision of virus cleaning and file repair mechanisms is highly useful, it is also important to provide notification to a user that for specific viruses whilst a computer file may have been cleaned and a repair attempted, the file may also have suffered damage that cannot be detected or repaired. The consequences of data corruption being undetected after virus infection and cleaning/repair are potentially very serious and accordingly the additional notification of this possibility to a user in those specific cases where it can occur is highly beneficial. Issuing the warning only in those circumstances where it could have occurred helps to maintain the impact of the warning to the user when it does occur.

In order to maintain the flexibility of the system and allow it to rapidly cope with new threats and circumstances, preferred embodiments of the invention utilise a library of anti computer virus drivers which can be added to and modified independently of the controlling computer programs. Thus, should a new virus be discovered, then a new addition to the library can rapidly follow and be implemented relatively easily to provide protection to users against the new virus. The library provides a highly convenient mechanism for marking particular drivers which are associated with particular computer viruses as being ones that can give rise to damage that cannot be automatically detected and so would require human intervention to detect and repair.

The library may also be used to specify particular types of warning that should be associated with particular detected computer viruses that may have caused irreparable damage. In this way, the message given to the user may be tailored to the particular file type and circumstances.

As a further refinement to the system, a notification message may be inserted within the target computer file. This notification message then persists with the target computer file such that when the file is used in the future users will be warned that it may have suffered damage that was not repaired and accordingly those users should be wary of relying upon the integrity of that computer file.

These notification messages also need to be made secure such that they cannot be faked and inserted within files which do not genuinely suffer from this potential problem and accordingly preferred embodiments are such that the notification message includes authentication data identifying the target file into which it was inserted and an electronic signature applied by the warning generator logic.

The special processing requirements that may be associated with files that cannot be properly repaired are better accommodated when, upon detection of a computer file infected in this way, the user is presented with different options for the further processing of that infected file than would be the case if a normal type of infection had occurred.

Viewed from other aspects the invention also provides a method of applying a plurality of anti computer virus tests to a target computer file and an apparatus for applying a plurality of anti computer virus test to a target file.

The above, and other objects, features and advantages of this invention will be apparent from the following detailed description of illustrative embodiments which is to be read in connection with the accompanying drawings.

BRIEF DESCRIPTION OF THE DRAWINGS

FIG. 1 schematically illustrates a library of computer virus detection drivers;

DESCRIPTION OF THE PREFERRED EMBODIMENTS

FIG. 1 illustrates a library of anti computer virus drivers of the type that may be used to control an anti computer virus program. Each driver is associated with a test for a particular computer virus, virus class or virus like characteristic. In addition to the driver, embodiments of the library employing the present technique also include a flag indicating whether or not that virus can produce irreparable damage to a computer file which it infects. If irreparable damage is a possibility, then the library also includes data identifying which type of enhanced warning (in addition to the standard warning that is normally issued) should be issued to the user upon detection of that computer virus.

In the example illustrated, the Wazzu driver is flagged as being one that can cause irreparable damage. As this is a virus that infects Word documents, the enhanced notification type is indicated as including insertion of a word banner into a repaired document to warn of the possibility of irreparable damage having occurred.

Figure 2:
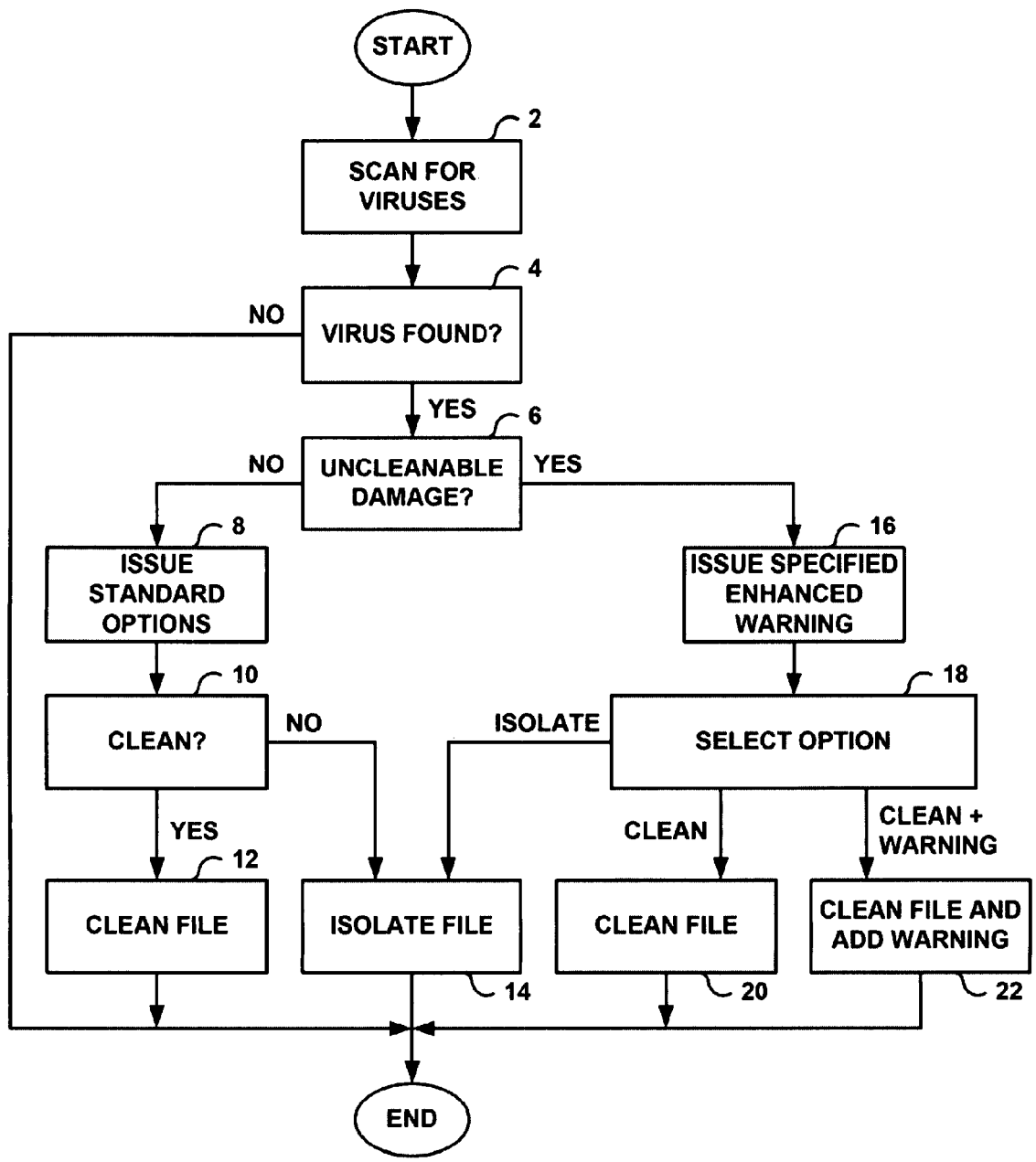
FIG. 2 is a flow diagram illustrating operation of anti virus computer software.

FIG. 2 is a flow diagram illustrating the operation of an anti computer virus program. At step 2, a scan for viruses is performed. This could be an on-access scan, an on-demand scan or a scan associated with operation of an E-mail scanning program or a web access scanning program amongst other examples. The mechanisms employed for this scan may in themselves be of a standard form.

Step 4 tests to see whether a virus was found in the scan of step 2. If no virus was found then processing terminates. If a virus was found then processing proceeds to step 6.

Step 6 looks within the library of drivers to find whether the driver file that identified the virus detected is associated with a flag indicating that that virus may produce irreparable damage. If irreparable damage is not a possibility, then processing proceeds to step 8.

At step 8 the user is issued with a standard virus detected warning and the standard options for proceeding further. In particular, step 10 may give the user the options to clean and repair the file at step 12 or quarantine the file at step 14. There may be additional options at this point, such as to delete the file.

If step 6 did determine that the virus detection could cause irreparable damage, then processing proceeds to step 16. Step 16 checks within the library of drivers to determine the type of notification that should be issued as is associated with the virus driver that detected the virus concerned. This warning is then issued.

At step 18, the user is presented with an expanded list of options as to how processing should proceed further given that the virus that has been detected is one that may have caused irreparable damage. As well as the options to quarantine the file at step 14 or to clean the file at step 20, an additional option of cleaning the file and adding a warning to the file is presented at step 22.

If the user selects the option of proceeding to step 22, then the file that was infected with the virus concerned is cleaned in the sense that the computer virus is removed from the file. In addition, repair may be attempted to reverse any changes made to that file that are of a nature to be capable of being automatically detected and reversed. In addition, a warning message is added to that file such that after cleaning and repair a user will be warned that the integrity of that file may have been compromised by its previous infection and accordingly the user should be on their guard. Depending upon the type of computer file concerned, this warning could take various forms. As examples, a Word document could have an additional page or banner inserted bearing the warning, an Excel spreadsheet could have an additional workbook inserted bearing the warning, various other files could have comments or REM statements inserted within them to carry the warning concerned. It is also possible that the notification warning might be stored elsewhere on the system, such as in an AUTOEXEC.BAT file to display a message to a user on startup to indicate that a specific file or the computer system as a whole may be carrying computer files that have suffered irreparable damage from a computer virus and accordingly may be compromised.

Figure 3:
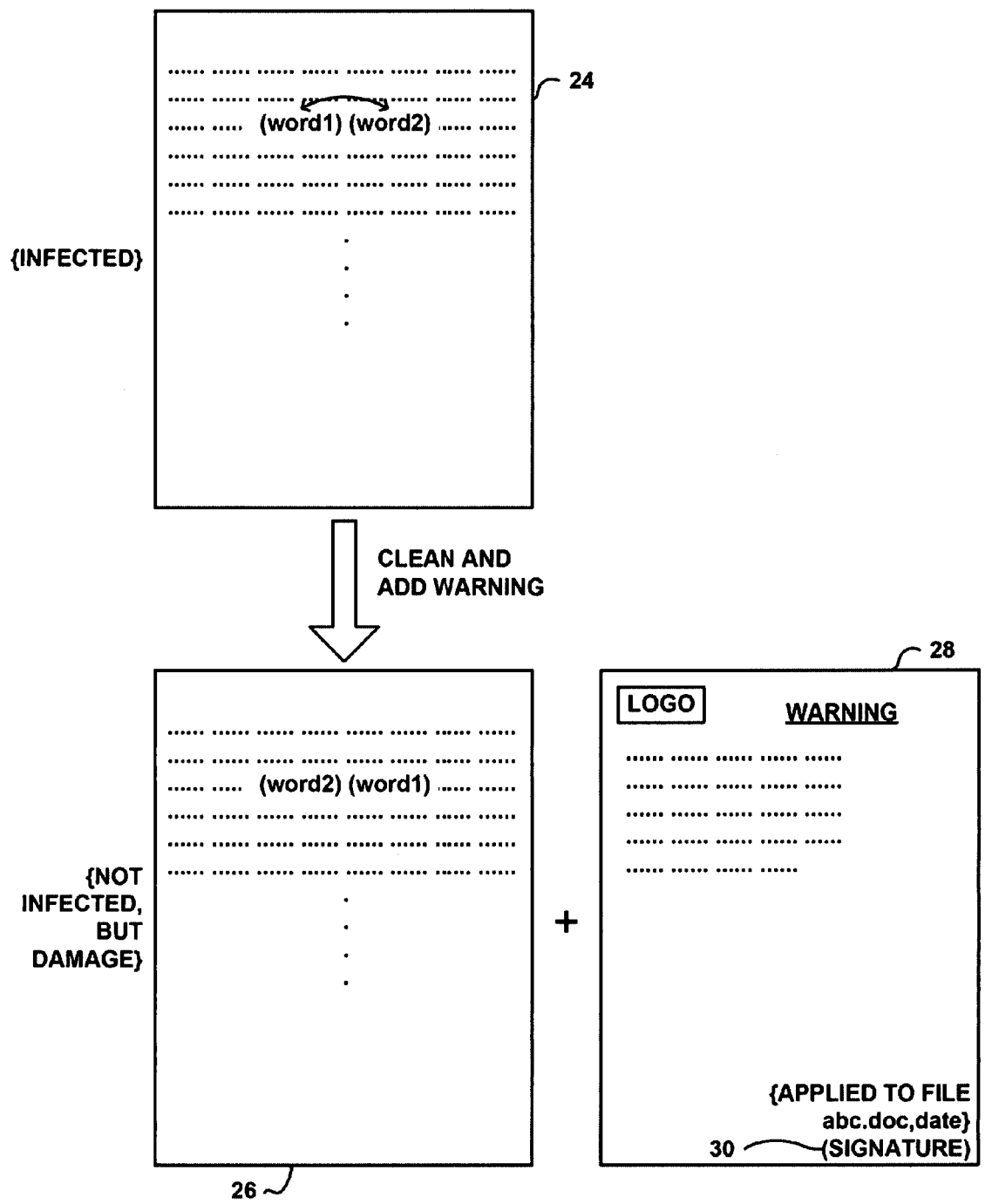
FIG. 3 is a diagram illustrating the insertion of a notification message within a repaired file.

FIG. 3 schematically illustrates the infection, damage, repair and warning addition that may be associated with a Word document. An infected Word document 24 carries the Wazzu virus. This virus can invert the positions of randomly selected word pairs within the document. This sort of modification is relatively subtle and not possible to automatically detect. Whilst the damage is subtle, it can be profound and seriously compromise the integrity of the infected file. Typically such a virus will progressively damage the file the more times the file is opened whilst infected. Accordingly, it is really a user judgement as to whether or not a repair should be attempted or whether the document should merely be discarded as it could not thereafter be trusted.

When the document 24 is subject to scanning by an anti computer virus program, the infecting virus is detected and the option to clean the file and add a warning is chosen. The resulting clean document 26 no longer carries the virus but has been damaged in the sense that previously inverted word pairs are still inverted. An additional page is added to the document so as to be carried with that document and provide future warning to users of that document of its potential corruption. Security measures are associated with this warning notification to prevent it from being readily faked. It would be possible for a malicious person without such security measures to insert fake warning messages in documents that had not in fact been damaged and this in itself could cause disruption and harm to a user. Accordingly, the inserted warning notification 28 is made difficult to fake by the insertion of a relatively complex logo, data identifying the file within which it was inserted and the date at which it was inserted and with this whole notification being electronically signed, such as with a PGP signature 30. Anti computer virus programs provided with the ability to insert such notification warnings may also be provided with a mechanism for checking and verifying the electronic signatures upon notification banners.

Figure 4:
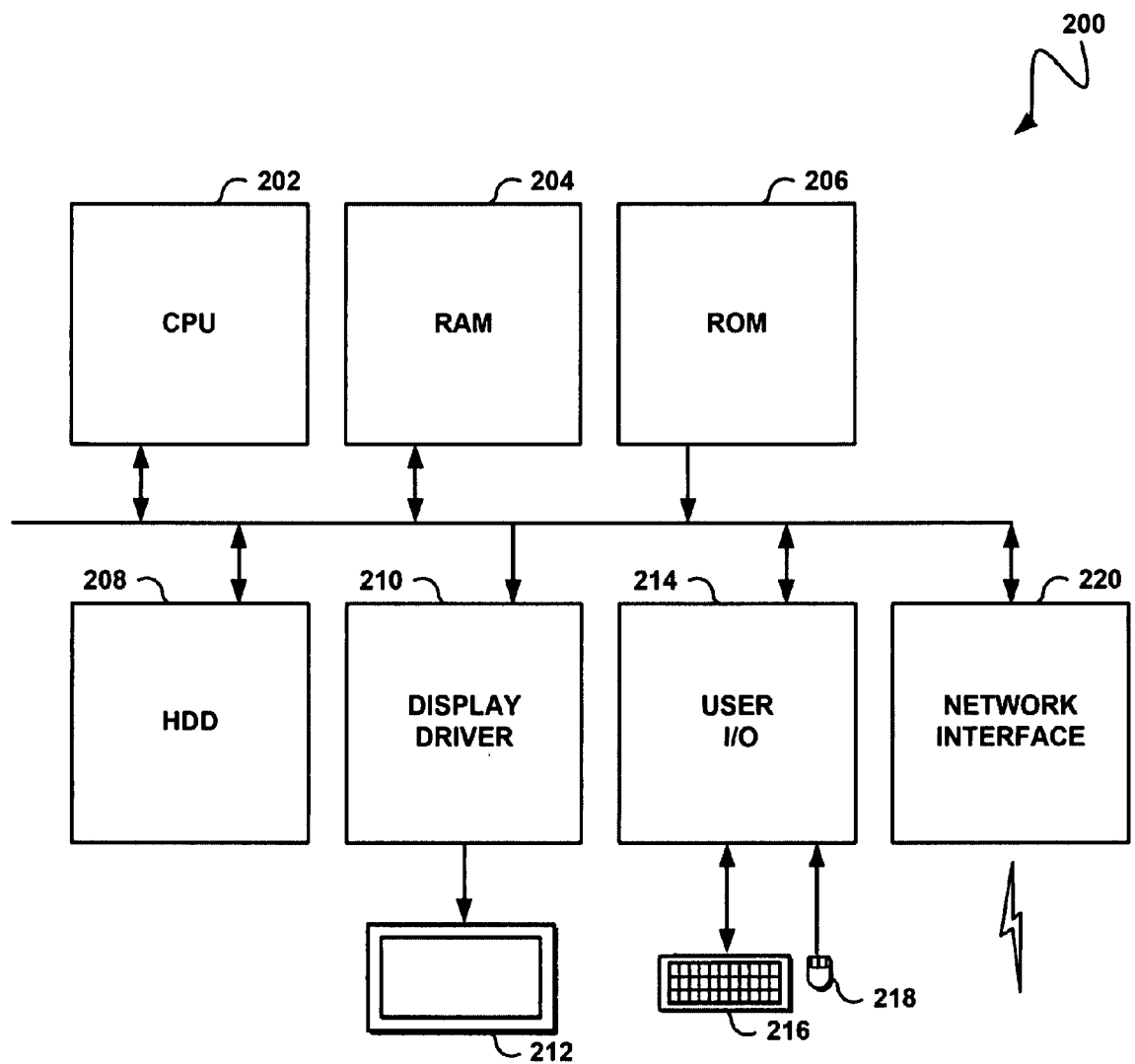
FIG. 4 is a schematic diagram of a general purpose computer which can be used to implement the above described techniques.

FIG. 4 schematically illustrates a computer 200 of a type that may be used to execute the computer programs described above. The computer 200 includes a central processing unit 202, a random access memory 204, a read-only memory 206, a hard disk drive 208, a display driver 210 and display 212, a user input/output circuit 214, a keyboard 216, a mouse 218 and a network interface circuit 220, all coupled via a common bus 222. In operation, the central processing unit 202 executes computer programs using the random access memory 204 as its working memory. The computer programs may be stored within the read-only memory 206, the hard disk drive 208 or retrieved via the network interface circuit 220 from a remote source. The computer 200 displays the results of its processing activity to the user via the display driver 210 and the display 212. The computer 200 receives control inputs from the user via the user input/output circuit 214, the keyboard 216 and the mouse 218.

The computer program product described above may take the form of a computer program stored within the computer system 200 on the hard disk drive 208, within the random access memory 204, within the read-only memory 206, or downloaded via the network interface circuit 220. The computer program product may also take the form of a recording medium such as a compact disk or floppy disk drive that may be used for distribution purposes. When operating under control of the above described computer program product, the various components of the computer 200 serve to provide the appropriate circuits and logic for carrying out the above described functions and acts. It will be appreciated that the computer 200 illustrated in FIG. 4 is merely one example of a type of computer that may execute the computer program product, method and provide the apparatus described above.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product stored in a computer readable storage medium comprising a computer program operable to control a computer to apply a plurality of anti computer virus tests to a target computer file, said computer program comprising:

(i) virus scanning logic for detecting if a target computer file is infected with a computer virus by applying a plurality of anti computer virus tests to said target computer file;

(ii) virus cleaning and file repair logic for cleaning said target computer file by removing a detected computer virus from said target computer file and for repairing any changes caused by said detected computer virus to said target computer file by reversing said changes;

(iii) virus identifying logic for detecting whether or not said detected computer virus is of a type that can cause changes to said target computer file that cannot be reversed by said virus cleaning and file repair logic; and (iv) warning generating logic, responsive to said virus identifying logic detecting that said detected computer virus is of a type that can cause changes to said target computer file that cannot be reversed by said virus cleaning and file repair logic, for generating a warning to a user that said target computer file may have suffered irreparable damage;

wherein said virus scanning logic is responsive to a library of tests to detect different computer viruses, said library including data specifying which computer viruses can cause changes that cannot be reversed by said virus cleaning and repair logic;

wherein said warning generating logic can generate a plurality of different types of warnings to said user that said target computer file may have suffered irreparable damage and said library includes data specifying which of said plurality of types of warnings should be issued in response to a particular detected computer virus; wherein said warning to said user that said target computer file may have suffered irreparable damage is associated with a notification message that includes authentication data identifying said target computer file into which said notification message was inserted.

2. A computer program as claimed in claim 1, wherein said warning to said user that said target computer file may have suffered irreparable damage includes an option to add said notification message into said target computer file.

3. A computer program as claimed in claim 2, wherein said notification message includes an electronic signature applied by said warning generating logic.

4. A computer program product as claimed in claim 1, wherein upon detection of a target computer file infected with a computer virus that may have caused irreparable damage, said virus cleaning and repair logic presents said user with different options for further processing of said target file than if said target computer file were infected with a computer virus that only causes reversible changes.

5. A method of applying a plurality of anti computer virus tests to a target computer file, said method comprising the steps of:

(i) virus scanning to detect if a target computer file is infected with a computer virus by applying a plurality of anti computer virus tests to said target computer file;

(ii) virus cleaning and file repairing to clean said target computer file by removing a detected computer virus from said target computer file and to repair any changes caused by said detected computer virus to said target computer file by reversing said changes;

(iii) virus identifying to detect whether or not said detected computer virus is of a type that can cause changes to said target computer file that cannot be reversed by said virus cleaning and file repair logic; and (iv) if said detected computer virus is of a type that can be removed from said target computer file but can cause changes to said target computer file that cannot be reversed by said virus cleaning and file repair logic, generating a warning to a user that said target computer file may have suffered irreparable damage;

wherein said virus scanning uses a library of tests to detect different computer viruses, said library including data specifying which computer viruses can cause changes that cannot be reversed by said virus cleaning and repair logic;

wherein said warning generation can generate a plurality of different types of warnings to said user that said target computer file may have suffered irreparable damage and said library includes data specifying which of said plurality of types of warnings should be issued in response to a particular detected computer virus; wherein said warning to said user that said target computer file may have suffered irreparable damage includes a notification message that includes authentication data identifying said target computer file into which said notification message was inserted.

6. A method as claimed in claim 5, wherein said warning to said user that said target computer file may have suffered irreparable damage includes adding said notification message into said target computer file.

7. A method as claimed in claim 6, wherein said notification message includes an electronic signature applied by said warning generating logic.

8. A method as claimed in claim 5, wherein upon detection of a target computer file infected with a computer virus that may have caused irreparable damage, said user is presented with different options for further processing of said target file than if said target computer file were infected with a computer virus that only causes reversible changes.

9. Apparatus for applying a plurality of anti computer virus tests to a target computer file, said apparatus comprising:

(i) a virus scanner for detecting if a target computer file is infected with a computer virus by applying a plurality of anti computer virus tests to said target computer file;

(ii) a virus cleaner and file repairer for cleaning said target computer file by removing a detected computer virus from said target computer file and for repairing changes caused by said detected computer virus to said target computer file by reversing said changes;

(iii) a virus identifier for detecting whether or not said detected computer virus is of a type that can cause changes to said target computer file that cannot be reversed by said virus cleaning and file repair logic; and (iv) a warning generator, responsive to said virus identifier detecting that said detected computer virus is of a type that can be removed from said target computer file but can cause changes to said target computer file that cannot be reversed by said virus cleaning and file repair logic, for generating a warning to a user that said target computer file may have suffered irreparable damage;

wherein said virus scanner is responsive to a library of tests to detect different computer viruses, said library including data specifying which computer viruses can cause changes that cannot be reversed by said virus cleaning and repair logic;

wherein said warning generator can generate a plurality of different types of warnings to said user that said target computer file may have suffered irreparable damage and said library includes data specifying which of said plurality of types of warnings should be issued in response to a particular detected computer virus; wherein said warning to said user that said target computer file may have suffered irreparable damage is associated with a notification message that includes authentication data identifying said target computer file into which said notification message was inserted.

10. Apparatus as claimed in claim 9, wherein said warning to said user that said target computer file may have suffered irreparable damage includes adding said notification message into said target computer file.

11. Apparatus as claimed in claim 10, wherein said notification message includes an electronic signature applied by said warning generating logic.

12. Apparatus as claimed in claim 9, wherein upon detection of a target computer file infected with a computer virus that may have caused irreparable damage, said virus cleaner and repairer presents said user with different options for further processing of said target file than if said target computer file were infected with a computer virus that only causes reversible changes.

* * * * *